(12) United States Patent
Kamiya

(10) Patent No.: US 11,511,414 B2
(45) Date of Patent: Nov. 29, 2022

(54) ROBOT CONTROL DEVICE

(71) Applicant: DAILY COLOR INC., Tokyo (JP)

(72) Inventor: Yasunori Kamiya, Tokyo (JP)

(73) Assignee: DAILY COLOR INC., Tokyo (JP)

( * ) Notice: Subject to any disclaimer, the term of this patent is extended or adjusted under 35 U.S.C. 154(b) by 0 days.

(21) Appl. No.: 17/674,467

(22) Filed: Feb. 17, 2022

(65) Prior Publication Data
US 2022/0168890 A1  Jun. 2, 2022

Related U.S. Application Data

(63) Continuation of application No. PCT/JP2020/032686, filed on Aug. 28, 2020.

(30) Foreign Application Priority Data

Aug. 28, 2019 (JP) ............................. JP2019-155446
Jul. 21, 2020 (JP) ............................. JP2020-124276

(51) Int. Cl.
*B25J 9/16* (2006.01)
*G05B 19/4155* (2006.01)

(52) U.S. Cl.
CPC .......... *B25J 9/163* (2013.01); *G05B 19/4155* (2013.01); *G05B 2219/50391* (2013.01)

(58) Field of Classification Search
CPC . B25J 9/163; B25J 13/00; B25J 13/08; G05B 19/4155; G05B 2219/50391
See application file for complete search history.

(56) References Cited

U.S. PATENT DOCUMENTS

| | | |
|---|---|---|
| 2005/0055134 A1 | 3/2005 | Okuda et al. |
| 2010/0249999 A1 | 9/2010 | Gläser et al. |
| 2011/0035053 A1 | 2/2011 | Guochunxu et al. |
| 2017/0028562 A1 | 2/2017 | Yamazaki et al. |

(Continued)

FOREIGN PATENT DOCUMENTS

| | | |
|---|---|---|
| JP | 2005-81445 | 3/2005 |
| JP | 2005-199403 | 7/2005 |

(Continued)

OTHER PUBLICATIONS

International Search Report (ISR) dated Oct. 13, 2020 in International (PCT) Application No. PCT/JP2020/032686.

(Continued)

*Primary Examiner* — Jason Holloway
(74) *Attorney, Agent, or Firm* — Wenderoth, Lind & Ponack, L.L.P.

(57) ABSTRACT

A robot control device is configured to control a robot and includes: a machine learning (ML) model for describing ranges of environments, or in other words, situations in each of which control for a control routine (operation control) executing an operation to achieve an operation objective is achievable; an operation control selector configured to select, based on an output value from the ML model, the operation control which is appropriate for the present situation; and an operation control executor configured to execute the operation control which has been selected. The operation control is a control routine for a robot to achieve an operation objective by the robot sensing a first object with interaction with a second object.

5 Claims, 10 Drawing Sheets

(56) References Cited

U.S. PATENT DOCUMENTS

| | | |
|---|---|---|
| 2017/0252922 A1 | 9/2017 | Levine et al. |
| 2017/0252924 A1 | 9/2017 | Vijayanarasimhan et al. |
| 2017/0348854 A1 | 12/2017 | Oleynik |
| 2018/0330200 A1 | 11/2018 | Shibata et al. |
| 2019/0084151 A1 | 3/2019 | Bai et al. |
| 2019/0091869 A1* | 3/2019 | Yamazaki .............. B25J 9/1679 |
| 2019/0358810 A1 | 11/2019 | Odhner et al. |
| 2019/0361672 A1 | 11/2019 | Odhner et al. |
| 2019/0375112 A1 | 12/2019 | Mariyama et al. |
| 2020/0139539 A1 | 5/2020 | Hasunuma et al. |
| 2021/0069898 A1* | 3/2021 | Duan ....................... G06N 3/08 |

FOREIGN PATENT DOCUMENTS

| | | |
|---|---|---|
| JP | 2006-285898 | 10/2006 |
| JP | 2010-179454 | 8/2010 |
| JP | 2012-125890 | 7/2012 |
| JP | 2017-64910 | 4/2017 |
| JP | 2018-51652 | 4/2018 |
| JP | 2018-190241 | 11/2018 |
| JP | 2018-206286 | 12/2018 |
| JP | 2019-503875 | 2/2019 |
| JP | 2019-509905 | 4/2019 |
| WO | 2017/103682 | 6/2017 |
| WO | 2017/151926 | 9/2017 |
| WO | 2018/017612 | 1/2018 |
| WO | 2018/146770 | 8/2018 |
| WO | 2018/236753 | 12/2018 |

OTHER PUBLICATIONS

Written Opinion of the International Searching Authority dated Oct. 13, 2020 in International (PCT) Application No. PCT/JP2020/032686 (with English translation).

Nilesh Kulkarni et al. "3D-RelNet: Joint Object and Relational Network for 3D Prediction" arxiv.org, Cornell University Library, 201 Olin Library Cornell University Ithaca, NY 14853, Jun. 6, 2019, XP081612730.

Extended European Search Report dated Aug. 29, 2022 in European Patent Application No. 20859507.4.

* cited by examiner

ROBOT CONTROL DEVICE

CROSS REFERENCE TO RELATED APPLICATIONS

This is a continuation application of PCT International Application No. PCT/JP2020/032686 filed on Aug. 28, 2020, designating the United States of America, which is based on and claims priority of Japanese Patent Application No. 2019-155446 filed on Aug. 28, 2019, and Japanese Patent Application No. 2020-124276 filed on Jul. 21, 2020. The entire disclosures of the above-identified applications, including the specifications, drawings and claims are incorporated herein by reference in their entirety.

FIELD

The present disclosure relates to the control of a robot including a sensor of some kind which senses an object in the vicinity using the sensor with interaction with other objects (including objects that could be called as environments, such as a wall and a floor). The present disclosure also relates to a structure of a control program for managing, evaluating, verifying, and improving an operation control to be executed by a robot.

BACKGROUND

Robots (e.g., an autonomously-controlled housekeeping robot and a nursing robot) that perform an operation involving interaction with another object in a free environment (open environment) in which an environment and a task are not fixed are required to flexibly operate according to an environment, or in other words, a situation (hereinafter, referred to as "environment/situation") in which the robots are provided. Moreover, these robots are required to perform various operations according to tasks.

It appears that the above-mentioned robots and robotic arms in work areas in factories are alike, but the robotic arms only travel on a single path (route) while handling a single object (i.e., an environment, a situation, and a task are fixed for each robotic arm). Accordingly, requirements to be met by the robotic arms are different from those by the above-mentioned robots. Moreover, bringing the above-mentioned robots into active use requires an evaluation, verification, and improvement.

Examples of operations performed by the above-mentioned robots are as follows. The robots (i) move objects placed in various locations to other various locations, (ii) hold an object from a side of the object, travel while holding the object, and place the object in another location, (iii) change direction after holding an object, (iv) draw an installed rod through a hole in an object, (v) insert a holding object in a gap between objects, and (vi) stack objects.

Furthermore, examples of an environment/situation in which an operation is performed by the above-mentioned robots are as follows: (i) various places and environments where an object is placed, (ii) presence of types of objects in the vicinity, and (iii) physical interference between objects.

As an example of consideration given to an object in the vicinity, a system that checks the presence of an object in the vicinity (a space occupied by the object), and checks whether a robot physically interferes with the object or not has been proposed (for example, see Japanese Unexamined Patent Application Publication No. 2005-81445; hereinafter, "JP 2005-81445").

In addition, a system that inputs sensor information to a machine learning model, and controls a target device according to an output of the machine learning model to implement flexible control of the target device has been proposed (for example, see Japanese Unexamined Patent Application Publication No. 2017-64910; hereinafter "JP 2017-64910").

SUMMARY

Technical Problem

The conventional system disclosed by JP 2005-81445 determines whether an object in the vicinity occupies a space or not, and performs an operation in an area in which no object is present. Accordingly, the system disclosed by JP 2005-81445 fails to consider (i) an operation involving a physical interaction, such as pushing of an object aside to place another object in the location, and (ii) a change of an operation according to a type of an object, for example. Accordingly, the system disclosed by JP 2005-81445 is unable to respond to control including such operations.

The system disclosed by JP 2017-64910 can implement flexible control of a target device in a wide range of situations under control using a machine learning model, but it is difficult for the system to manage, evaluate, verify, and modify operation controls for each individual situation.

Moreover, in the case where a modification is made to an operation control due to an operation error in a certain situation, the conventional techniques fail to consider an effect that the modification exerts on an operation of the operation control in another situation. The modification may affect the operation of the operation control performed in another situation. The modification may change the operation, and thus the operation may fail or may be unsuccessful, even if the operation had originally been successful in situations (situations in each of which an operation that can achieve an objective had been implemented). For this reason, an evaluation and verification to determine whether an operation is successful or not needs to be performed again in every situation.

The present disclosure aims to provide a robot control device that can individually manage and modify control of operations to be performed according to respective situations, while implementing flexible control of a robot according to wide ranges of environments/situations.

Solution to Problem

In order to provide such a robot control device, the present disclosure according to a first aspect is a robot control device that controls a robot. The robot control device is characterized as including: a machine learning model that receives an input of any given item of situation information selected from among items of situation information, and outputs an output value that is one of a binary value, a continuous value, and a multidimensional vector value indicating success or failure or a degree of success of an operation of a provided operation control in a situation indicated by the any given item of situation information received, the items of situation information being information about the robot or an object in a vicinity of the robot, and including: (i) physical characteristics including a physical structure and a shape; (ii) a present status of at least one of a position, a posture (orientation), or a temperature that is a temporally varying characteristic; (iii) a relative relationship between the physical characteristics or between the present statuses; and (iv) a combination of the physical characteristics, a combination of the present statuses, or a combination of the physical characteristics and the present status; an operation control selector that obtains the output value for at least one operation control by providing the machine learning model with the any given item of situation information when the any given item of situation information is received, and identifies, based on the output value, an operation control to be executed; and an operation control executor that executes the operation control identified by the operation control selector. The operation control is a control routine for the robot to achieve an operation objective by the robot sensing an object in a vicinity of the robot using a sensor with interaction with another object.

The present disclosure according to the first aspect here may include: a machine learning model that receives an input of any given item of situation information selected from among items of information which are information about an object in the vicinity or a target robot itself and include (i) physical characteristics including a physical structure and a shape, (ii) a present status of a temporally varying characteristic (a position, a posture (orientation), or a temperature), (iii) a relative relationship between the foregoing, and (iv) a combination of the foregoing, and outputs an output value indicating success or failure or a degree of success (one of a binary value, a continuous value, and a multidimensional vector value) of an operation of a provided operation control in a situation received; an operation control selector that obtains the output value for each of operation controls corresponding to an operation objective by providing the machine learning model with an item of situation information when the operation objective and the item of situation information are received, and selects, based on the output values, an operation control to be executed among the operation controls corresponding to the operation objective; and an operation control executor that executes the operation control selected by the operation control selector. The operation control may be a control routine for achieving an operation objective by sensing an object in the vicinity using a sensor with interaction with another object.

The present disclosure according to the first aspect here may be characterized as including: machine learning models which are provided according to the number of operation controls corresponding to an operation objective for each of operation objectives, and each of which receives an input of any given item of situation information selected from among items of information (items of situation information) which are information about an object in the vicinity or a target robot itself and include (i) physical characteristics including a physical structure and a shape, (ii) a present status of a temporally varying characteristic (a position, a posture (orientation), or a temperature), (iii) a relative relationship between the foregoing, and (iv) a combination of the foregoing, and outputs output values each indicating success or failure or a degree of success (one of a binary value, a continuous value, and a multidimensional vector value) of an operation of a provided operation control in a situation received; an operation control selector that obtains the output values for the operation controls corresponding to the operation objective by providing each of the machine learning models provided according to the number of the operation controls corresponding to the operation objective with an item of situation information when the operation objective and the items of situation information are received, and selects, based on the output values, an operation control to be executed among the operation controls corresponding to the operation objective; and an operation control executor that executes the operation control selected by the operation control selector. The operation control may be a control routine for achieving an operation objective by sensing an object in the vicinity using a sensor with interaction with another object.

A variation of the present disclosure according to the first aspect may be characterized as, even if the machine learning model is either individually built for each provided operation control or has a single model configuration, performing learning using a model capable of learning about a target operation control using a method in which the output value for an operation control other than the operation control to be learned is not affected.

The present disclosure according a second aspect is characterized in that the any given item of information includes at least any one of an absolute position, a relative position, a posture (orientation), a shape, or a type of the object. That is, the any given item of situation information is characterized as including at least any one of a position (an absolute position or a relative position), a posture (orientation), a shape, and a type of an object.

The present disclosure according a third aspect is characterized as further including a training data generator that generates, as training data for the machine learning model, a data pair in which situation data and success or failure data are paired, the data pair being generated from at least one of (i) a design specification value, (ii) a result of an operation of the operation control which is performed by an actual robot, (iii) a rule of thumb developed by a person, or (iv) a result of the operation of the operation control which is performed in a physics simulator. That is, the present disclosure according to the third aspect is characterized as further including a training data generator that generates, as training data for the machine learning model, a data pair in which situation data and success or failure data are paired. The data pair is generated from at least one of a design specification value, a result of an operation of the operation control which is performed by an actual device, a rule of thumb developed by a person, or a result of the operation of the operation control which is performed in a physics simulator.

The present disclosure according to a fourth aspect is characterized in that, when the training data generator generates the data pair using the physics simulator, the training data generator (i) provides the physics simulator with, in addition to an operation control, a condition defining a status in which an operation of the operation control is successful, (ii) executes the operation control while variously changing, in the physics simulator, the items of situation information each indicating an environment, (iii) tests whether the operation of the operation control is successful or not, and (iv) generates the data pair based on a result of the testing. That is, the training data generator is characterized in that, when the training data generator performs the generation using the physics simulator, the training data generator provides, in addition to an operation control, a condition defining a status in which an operation of the operation control is successful, variously changes environments (the items of situation information) in the physics simulator and executes the operation control provided, tests whether the operation of the operation control is successful or not, and generates the data pair based on a result of the testing.

The present disclosure according to a fifth aspect is characterized in that, when the training data generator tests whether the operation of the operation control is successful or not using the physics simulator, the training data generator identifies at least one of the items of situation information indicating an environment in which the operation of the operation control provided is successful, and scans, from the at least one of the items of situation information identified as a starting item to be scanned, the items of situation information each indicating an environment in which the operation of the operation control is tested. That is, the present disclosure according to the fifth aspect is characterized as providing at least one of environments (item of situation information) in which the operation of the operation control provided is successful, and scanning environments (the items of situation information) to be tested from the at least one of environments as a starting point of the scanning, when success or failure of the operation of the operation control is tested in the physics simulator.

Advantageous Effects

The present disclosure provides a robot control device that can individually manage and modify control of operations to be performed according to respective situations, while implementing flexible control of a robot according to wide ranges of environments/situations.

More specifically, the present disclosure according to the first aspect can flexibly determine situations in each of which an operation of an operation control is successful, and can appropriately perform the operation. In other words, even if an operation of an operation control is imagined by a person which is high level and extremely complex due to diverse and a vast amount of information, or is difficult to be described by a person, the use of a machine learning model readily makes it possible to describe a boundary of each of ranges of situations in each of which the operation of the operation control is successful.

According to the variation of the present disclosure according to the first aspect, a machine learning model that determines a situation can add a determination about situations concerning a new operation control, and modify a determination about situations concerning an existing operation control, without affecting a determination to be made about a situation concerning another operation control.

The present disclosure according to the second aspect produces an effect equivalent to the effect produced by the present disclosure according to the first aspect.

The present disclosure according to the third aspect produces an effect equivalent to the effect produced by the present disclosure according to the first aspect.

According to the present disclosure according to the fourth aspect, it is possible to automatically build and modify (train and retrain) a machine learning model that determines situations.

According to the present disclosure according to the fifth aspect, it is possible to effectively perform, when a machine learning model that determines situations is automatically built and modified (trained and retrained), a test on each of ranges of situations in each of which an operation of an operation control is successful by using provided situation information as a starting item for scanning when the situation to be tested is scanned.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Embodiment

Hereinafter, embodiments according to the present disclosure will be described in detail.

Figure 1:
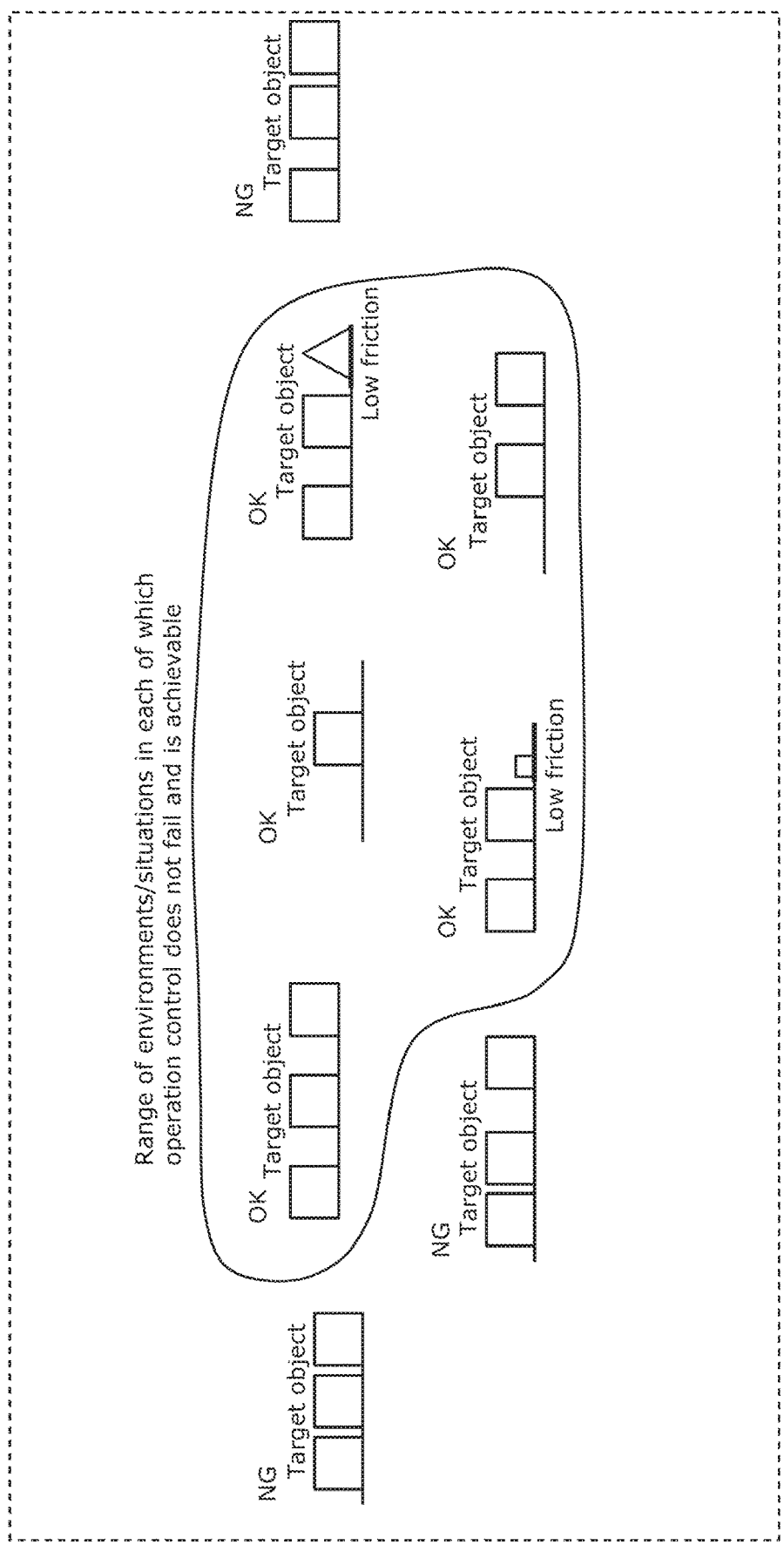
FIG. 1 is a diagram illustrating the basic concept of a robot control device according to an embodiment.

FIG. 1 is a diagram illustrating the basic concept of a robot control device according to an embodiment. FIG. 1 here exemplifies a range of environments, in other words, situations (hereinafter, referred to as "environment(s)/situation(s)") when a robotic arm handles target objects. In the diagram, the term "NG" denotes a range of environments/situations in each of which a robotic arm is inoperative.

As illustrated in the diagram, the robot control device according to the embodiment uses a concept of ranges of environments/situations in each of which an operation control does not fail and is achievable. That is, the above-described ranges are automatically calculated for each of operation objectives and operation controls. In addition, these operation controls are individually managed.

Here, the phrase "an environment/situation" indicates types of target objects and objects in the vicinity, ways that these objects are placed, statuses of these objects, environments in which these objects are placed, etc. Since meaning of the phrase an environment/situation includes types of various objects, positional relationships, situations, etc., the phrase conceptually indicates a multidimensional space. Moreover, depending on an operation, the phrase an environment/situation also indicates a shape and a posture (orientation) of a robot. When consideration is given to a case where a plurality of robots operate together, the phrase an environment/situation also indicates a positional relationship and a posture (orientation) relationship of each robot.

Although the embodiment is described using a robotic arm as an example, it should be noted that the robot control device according to the embodiment is applicable to all sorts of robots, regardless of shapes and structures of robots. Moreover, although information indicating a degree to which an operation control is achievable is denoted by binary values which are "OK" and "NG" in FIG. 1, values denoting the information are not limited to these binary values. The information may be denoted by analog values such as probabilities within the range of from 0 to 1, or may be expressed in multiple dimensions (a plurality of elements).

Figure 2:
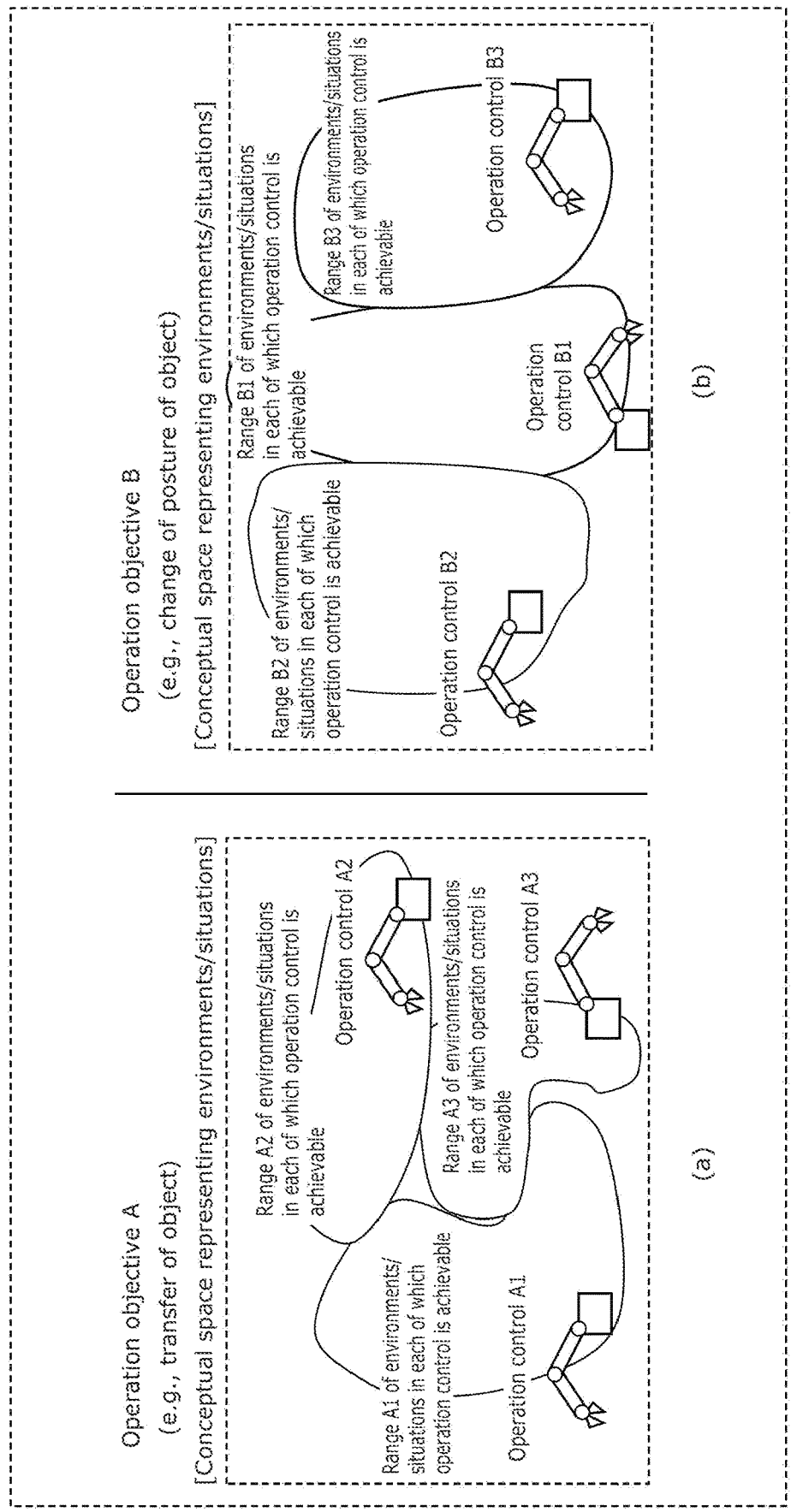
FIG. 2 is a diagram illustrating details of the basic concept of the robot control device according to the embodiment.

FIG. 2 is a diagram illustrating details of the basic concept of the robot control device according to the embodiment. As illustrated in the diagram, one or more operation controls correspond to each of operation objectives in the robot control device according to the embodiment. Each of operation controls is individually managed and is independent.

Part (a) of FIG. 2 exemplifies a conceptual space representing environments/situations for operation objective A (e.g., transfer of an object). In this example, operation control A1 is achievable in range A1 of environments/situations in each of which an operation control is achievable. Operation control A2 can be executed in range A2 of environments/situations in each of which an operation control is achievable. Operation control A3 can be executed in range A3 of environments/situations in each of which an operation control is achievable.

Part (b) of FIG. 2 exemplifies a conceptual space representing environments/situations for operation objective B (e.g., a change of a posture (orientation) of an object). In this example, operation control B1 can be executed in range B1 of environments/situations in each of which an operation control is achievable. Operation control B2 can be executed in range B2 of environments/situations in each of which an operation control is achievable. Operation control B3 can be executed in range B3 of environments/situations in each of which an operation control is achievable.

In the robot control device according to the embodiment, one or more operation controls correspond to one or more operation objectives with consideration given to ranges in each of which an operation control does not fail, as illustrated in FIG. 2. Alternatively, a single operation control may correspond to a plurality of operation objectives, since there is a case where a single operation control can achieve a plurality of different operation objectives for some reasons.

A single operation control here indicates one or more control routines (control programs) for a robot to achieve an operation objective by sensing objects in the vicinity using a sensor with interaction with other objects. Moreover, the operation control to be evaluated by a machine learning model (ML model) included in the robot control device according to the embodiment is not a control for a robot to perform a simple and primitive motion determined by a single traveling direction vector or a single target position, but is a control for a robot to achieve an operation objective by sensing objects in the vicinity using a sensor with interaction with other objects (hereinafter referred to as "operation objective achieving processing involving sensing and interaction"). Accordingly, it is possible to (i) implement a robot control that is assuredly executed, and (ii) handle ranges of situations in each of which an operation of an operation control achieves an operation objective (ranges of situations in each of which an operation of an operation control is successful). This produces an effect of enabling advanced management of operation controls.

Note that "interaction with other objects" made by a robot includes not only a case in which a robot is in physical contact with other objects, but also a case in which a robot has a contactless relationship with other objects, instead of or in addition to the case in which the robot is in physical contact with other objects. The contactless relationship may include, for example, a spatial relationship (a predetermined relationship between positions and/or between distances), a presence relationship (recognition of the presence of an object by a robot), a communication relationship (communication between a robot and an object in a wireless manner, etc.).

Moreover, "operation objective achieving processing involving sensing and interaction" is, for example, a series of primitive motions that achieves an operation objective using, as feedback information, a result obtained from a sensor, and can be typically expressed as a sequence of motions determined depending on a result of sensing.

Note that the motions include an arm motion, an arm operation, a hand motion, a hand operation, a hand part, a hand unit operation, a posture (orientation), a posture (orientation) control, a body part motion, a leg part motion, etc.

The following may apply as a concept of a relationship between an operation objective and an operation control: (i) an operation control is a logic (in other words, a procedure or an algorithm) constructed for achieving an operation objective, and (ii) the operation objective is an effect produced by an operation control alone (in other words, an effect expected as a result of executing a single operation control, a purpose of using the operation control alone, and/or an objective that the operation control is to achieve). Moreover, an operation objective may be an effect produced through interaction with another object. Alternatively, an operation objective need not be an effect produced or expected by a series of operation controls in which a plurality of operation controls are assembled, and/or by an operation control set. In this case, the plurality of operation controls may include a plurality of operation controls having different control details, a plurality of operation controls having the same control detail, or a mixture of the plurality of operation controls having different control details and the plurality of operation controls having the same control detail.

Moreover, an operation control and the entire processing performed by the robot control device use concepts of a logic, a command value, and a static parameter. A logic is a detail of processing, an algorithm, a procedure, and/or a processing routine, and does not typically change when the robot control device is in operation. A command value is a value provided for a logic and/or a parameter provided for a logic. The command value takes various values when the robot control device is in operation, and is a value provided for a logic, a command, and/or a value provided for a logic as an instruction. Except for a case in which a command detail is predetermined when the robot control device is provided, a command value is typically determined according to the situation in which the robot control device is in when the robot control device is in operation, and types of commands and orders of the commands are determined, or in other words, a value that the command value takes is determined. A static parameter is a parameter provided for a logic, and is different from a command value in that the static parameter typically takes the same value without a change in the value when the robot control device is in operation. Although a procedure (in other words, a logic or an algorithm) is not changed, the static parameter is a value to be finely modified and/or a parameter to be finely modified when an effect of processing is modified or finely modified, not typically when the robot control device is in operation, but during a time in which the robot control device is not in operation, such as a timing in which the maintenance of the robot control device is carried out. In this case, an operation control corresponds to a logic, or to a combination of a logic and a static parameter, and does not include a command value. Moreover, a command value corresponds to an operation objective, or to information (not illustrated in FIG. 3) relating to and associating with an operation objective. Furthermore, operation controls having the same logic, or the same combination of a logic and a static parameter are treated as one operation control. Accordingly, for example, a difference in command values does not result in the provision of a plurality of operation controls. In this case, the entire processing of the present disclosure is conceptually performed as follows: (i) receiving of an input of an operation objective, or receiving of inputs of an operation objective and a command value; (ii) obtaining of situation information from a detector; and (iii) selection of an operation control (a logic, or a combination of a logic and a static parameter) based on the operation objective (and the command value) and the situation information. Alternatively, the entire processing performed by the robot control device according to the present disclosure need not include (or may exclude) the following processes: (i) obtaining of situation information from a detector; and (ii) selection of a command value based on the situation information.

Moreover, an operation objective is an effect produced by a series of operation controls whose order is fixed. Here, a series of operation controls whose order is fixed may be treated as a single operation control. Furthermore, when the order of a series of operation controls differs from the order of another series of operation controls, these series of operation controls may be considered to be having different operation objectives to be achieved.

Figure 3:
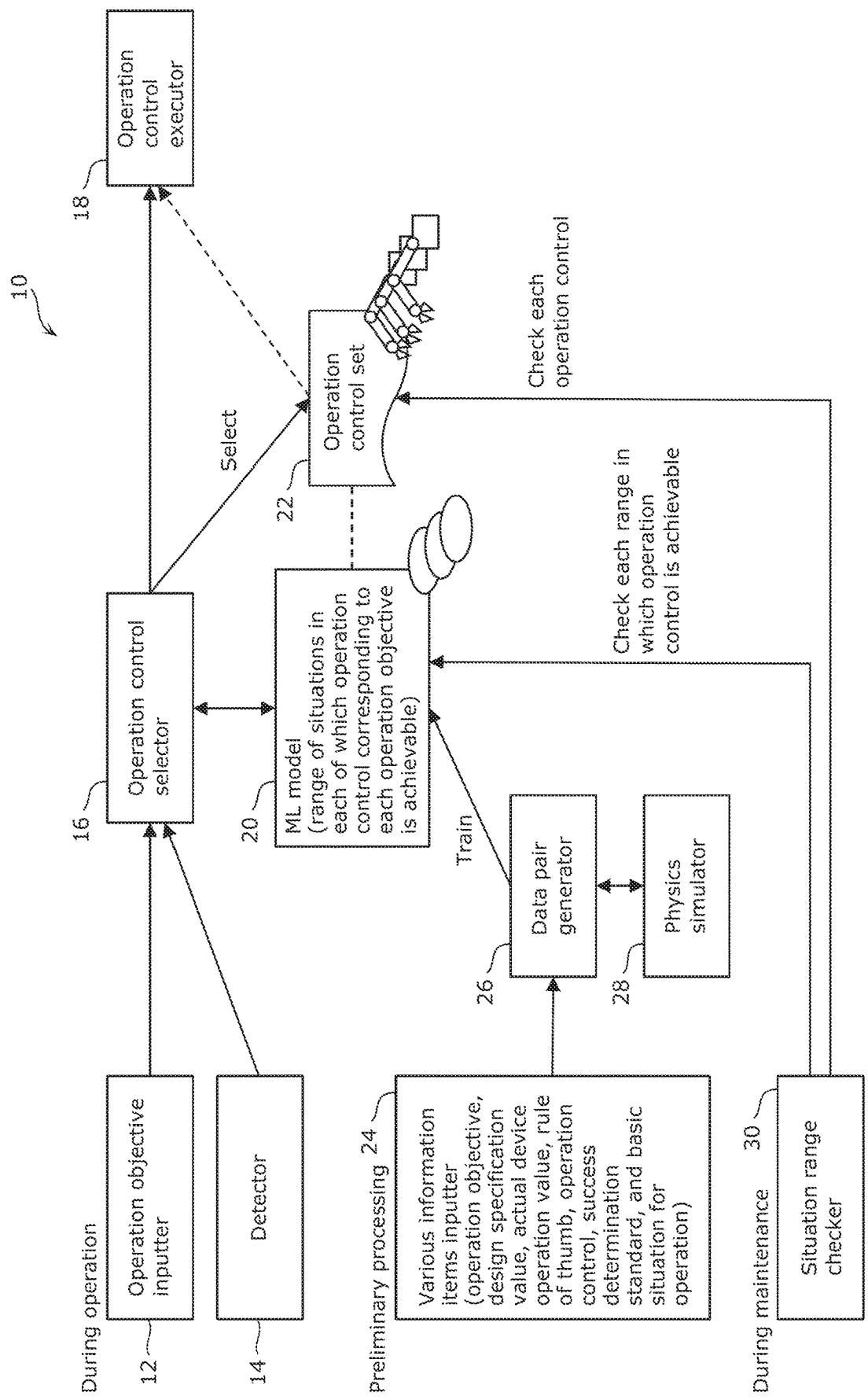
FIG. 3 is a block diagram illustrating a configuration of the robot control device according to the embodiment.

FIG. 3 is a block diagram illustrating a configuration of robot control device 10 according to the embodiment. Robot control device 10 is a device for controlling a robot, and includes: operation objective inputter 12; detector 14; operation control selector 16; operation control executor 18; machine learning (ML) model 20 in which ranges of situations in each of which an operation control corresponding to an operation objective is achievable are described; operation control set 22; various information items inputter 24 that inputs various information including, for example, an operation objective, a design specification value, an actual device operation value (any value obtained when an actual robot is operated), a rule of thumb, an operation control, a success determination standard, a basic situation for an operation; data pair generator 26 that generates a data pair in which situation data and success or failure data indicating success or failure of an operation of an operation control are paired; physics simulator 28, and situation range checker 30 that checks ranges of situations in each of which an operation control is achievable. Robot control device 10 includes a model (ML model 20) in which ranges of situations in each of which an operation control is achievable are described, and obtains data samples for learning the model from a design specification value, actual device operation values, rules of thumb, a physics simulator (physics simulator 28), etc. This processing is automatically performed regardless of the detail of an operation control.

Operation objective inputter 12 is a processor that obtains at least one operation objective, and outputs the at least one operation objective to operation control selector 16. Operation objective inputter 12 is, for example, a communication interface that obtains information from outside.

Detector 14 is a processor that obtains any given item of situation information from among items of situation information, and outputs the obtained item of situation information to operation control selector 16. Detector 14 is, for example, a camera or an acceleration sensor. The items of situation information are information about a robot or an object in the vicinity of the robot, and include: (i) physical characteristics including a physical structure and a shape; (ii) a present status of at least one of a position, a posture (orientation), and/or a temperature that is a temporally varying characteristic; (iii) a relative relationship between the physical characteristics or between the present statuses; and (iv) a combination of the physical characteristics, a combination of the present statuses, or a combination of the physical characteristics and the present status.

Besides the foregoing items of situation information, the situation information may deal with or include information on statuses related to the following: information possessed by an object; an internal status of an object; a mentality, a feeling, a way of thinking, a detail of a thought, and a habit of a person and an animal in the vicinity; any method and process possessed by a person, an animal, and a device in the vicinity, etc., which can be obtained from light (illumination and shade), air, a sound, a speech, an appearance and a status of an object, a human, and an animal through processing using a camera and making a direct inquiry to an object and a person.

ML model 20 is a model that receives an input of situation information, and outputs an output value that is a binary value, a continuous value, or a multidimensional vector value indicating success or failure or a degree of success of an operation of a provided operation control in a situation indicated by the received situation information. For example, ML model 20 is related to a deep neural network (DNN) or deep learning which will be described later with reference to FIG. 7. Note that a binary value, a continuous value, or a multidimensional vector value indicating success or failure or a degree of success of the operation of the provided operation control may be a value including a plurality of elements, and each element may include a discrete value or a continuous value. Moreover, a binary value, a continuous value, or a multidimensional vector value indicating success or failure or a degree of success of the operation of the provided operation control is not only a direct numerical expression, but may also be, for example, (i) an indirect numerical expression that indirectly expresses success or failure or a degree of success of the operation using a numerical value that is a combination of the numerical value and an element, (ii) a numerical expression indicating success or failure or a degree of success of the operation in the form that a person cannot readily understand the details, or (iii) a text format, rather than a numerical expression. In addition, a binary value, a continuous value, or a multidimensional vector value indicating success or failure or a degree of success of the operation of the provided operation control may be, for example, a decision tree including a random forest, a Bayesian inference method including a Bayesian network, or a statistical model based on a probability theory. Besides the foregoing, a binary value, a continuous value, or a multidimensional vector value indicating success or failure or a degree of success of the operation of the provided operation control may be any kind of an explainable model whose modeled detail is, not fully, but to a certain level, comprehensible to a person.

Moreover, ML model 20 may output a value indicating whether received situation information agrees with a situation in which an operation control is properly achievable, or with a situation in which an operation of the operation control is successful.

Figure 10:
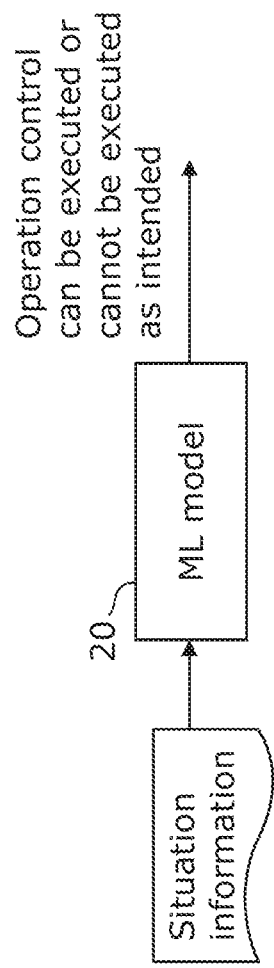
FIG. 10 is a diagram illustrating the machine learning model according to the embodiment.

In addition, as illustrated in FIG. 10, ML model 20 may output a value indicating whether an operation control can be executed as intended or not in a situation indicated by the received situation information. FIG. 10 is a diagram illustrating ML model 20 according to the embodiment.

Furthermore, a value indicating success or failure or a degree of success of an operation which is outputted by ML model 20 need not be a value indicating a degree of success of the operation in a situation in which the operation control is marginally successful, but may be a degree of success of the operation in a situation in which the operation control is assuredly and sufficiently successful. In other words, the degree of success of an operation may indicate a degree of success of an operation in the received situation in which an operation control is accurately and reliably estimated to be achievable. Moreover, even if a situation is sufficiently detected or observed, uncertainty or an undetected or unobserved internal status does exist to a certain extent, and in fact, the uncertainty or the undetected or unobserved internal status cannot be completely eliminated and certainly exists to a certain extent. However, if the uncertainty or the undetected or unobserved internal status is insignificant, ML model 20 may output a value indicating a degree of estimation that a status can be determined to be a status in which an operation of an operation control is sufficiently successful based on the obtained situation information, even with consideration given to the uncertainty or the undetected or unobserved internal status.

Operation control set 22 is a set of one or more operation controls which is achieved by a robot, or in other words, a set of one or more operation controls which are candidates for an operation control that can be identified (i.e., selected) by operation control selector 16. Operation control set 22 is, for example, a set of control routines stored in a memory.

Operation control selector 16 is a processor that (i) obtains an output value for at least one operation control by providing ML model 20 with situation information, when an operation objective from operation objective inputter 12 and the situation information from detector 14 is received; (ii) based on the obtained output value, identifies (i.e., selects) an operation control to be executed from operation control set 22, and (iii) notifies the identified operation control to operation control executor 18.

Operation control executor 18 is a processor that executes an operation control identified by operation control selector 16. Operation control executor 18 may be a structural element (see FIGS. 3, 8, and 9) that receives, via operation control selector 16, situation information 14a obtained from detector 14, and executes an operation control based on a value indicated by situation information 14a. Alternatively, besides situation information 14a obtained from detector 14, operation control executor 18 may be a structural element that independently receives, for each operation control, information other than situation information 14a, such as a value expressed in a form different from a value indicated by situation information 14a, sensor values obtained from different sensors, and information obtained from an external device, and executes an operation control based on situation information 14a and the foregoing values, or based on the foregoing values.

Various information items inputter 24 is a processor that obtains various types of information, such as an operation objective, a design specification value, an actual device operation value, a rule of thumb, an operation control, a success determination standard, and an operation basic situation, and outputs various types of information to data pair generator 26. Various information items inputter 24 is, for example, a communication interface that obtains information from outside.

Data pair generator 26 is an example of a training data generator that generates, as training data for ML model 20, a data pair in which situation data and success or failure data indicating success or failure of an operation of an operation control are paired. The data pair is generated from (i) a design specification value, (ii) a result of an operation of an operation control which is performed by an actual robot, (iii) a rule of thumb developed by a person and/or (iv) a result of an operation of an operation control which is performed in a physics simulator (physics simulator 28). When data pairs in each of which situation data and success or failure data are paired are generated using the physics simulator (physics simulator 28), data pair generator 26 (i) provides the physics simulator with, in addition to an operation control, a condition defining a status in which an operation of the operation control is successful, (ii) executes the operation control while variously changing, in the physics simulator, items of situation information each indicating an environment, (iii) tests whether the operation of the operation control is successful or not, and (iv) generates, based on a result of the testing, a data pair in which situation data and success or failure data are paired. Note that the success or failure data is any item of information data indicating success or failure of an operation of an operation control, and need not be expressed only by binary values corresponding to success and failure.

Physics simulator 28 is a processor that executes a provided operation control through a simulation, and returns a result of the execution, as a substitute for a robot.

Situation range checker 30 is a processor that checks ML model 20 (trained in the preliminary processing) provided for operation controls to find out, for an operation objective and a situation, which operation controls are associated with the operation objective and the situation, or to find out that no operation control is associated with the operation objective and the situation. If necessary, a new operation control is made, and is associated according to a procedure of the preliminary processing.

Note that each of the above-described structural elements may be implemented as software using, for example, a memory for storing a program and data, and a processor for executing the program, or may be implemented as hardware such as an electric circuit exemplified by, for example, a semiconductor integrated circuit. All or some of the structural elements included in robot control device 10 as described above may be included in a robot, or may be provided in a device outside a robot which is communicable with the robot.

Moreover, if a machine learning model is used for realizing an operation control (i.e., implementation of an operation control, or concretization of a process for enabling actual implementation of an operation control in a real-life situation), the machine learning model for implementing an operation control (hereinafter, referred to as a machine learning model for an operation control) and ML model 20 may be integrated into a single machine learning model. For example, when a type of input for a machine learning model for an operation control and a type of input for ML model 20 are the same, the foregoing single machine learning model receives such type of input as a common input, and outputs each of a value for an operation control and a value indicating success or failure of the operation control which is typically outputted by ML model 20. In this case, a value indicating success or failure or a degree of success of an operation is transmitted inside ML model 20, and the detail of the value may be in the form comprehensible to a person or in the form incomprehensible to a person. That is, ML model 20 need not be limited to a particular physical configuration. For example, ML model 20 may be an individual machine learning model built for each operation objective, an individual machine learning model built for each operation control, a single machine learning model corresponding to a plurality of operation objectives, and a single machine learning model corresponding to a plurality of operation controls.

Moreover, besides ML model 20, each of functional structural elements included in robot control device 10, such as detector 14, operation control selector 16, operation control set 22, and operation control executor 18, can be built by a machine learning model. Furthermore, a plurality of functional structural elements can be built by a single machine learning model. Accordingly, some or all functional structural elements included in robot control device 10 may be built by a single machine learning model or a plurality of machine learning models.

When a machine leaning model is an individual machine learning model built for each operation control, an input and an output of each machine learning model need not be the same.

Alternatively, when a machine learning model is not an individual machine learning model built for each operation control, but has a single model configuration, the following two cases apply with regard to an output of a model when an operation is added and a range of situations is modified.

When a model is: (i) a model that has a fixed configuration, and changes only an output value when an operation is added and a range of situations is modified; and (ii) a model capable of learning about a target operation control using a method in which an output value relating to an operation control other than the operation control to be learned is not affected or slightly affected, an output of the model is a multidimensional vector value, for example. The model is trained such that an output value of a new pattern is outputted when an operation control is added.

When a model is: (i) a model that changes and/or extends the model configuration, and changes an output value when an operation control is added and a range of situations is modified; and (ii) a model capable of learning about a target operation control using a method in which an output value relating to an operation control other than the operation control to be learned is not affected or slightly affected, a new operation control is added by changing the structure of an output value calculation. For example, an output calculator for a new operation control is added to the model configuration.

For simplification of description, the following describes an individual machine learning model build for each operation control.

Figure 4:
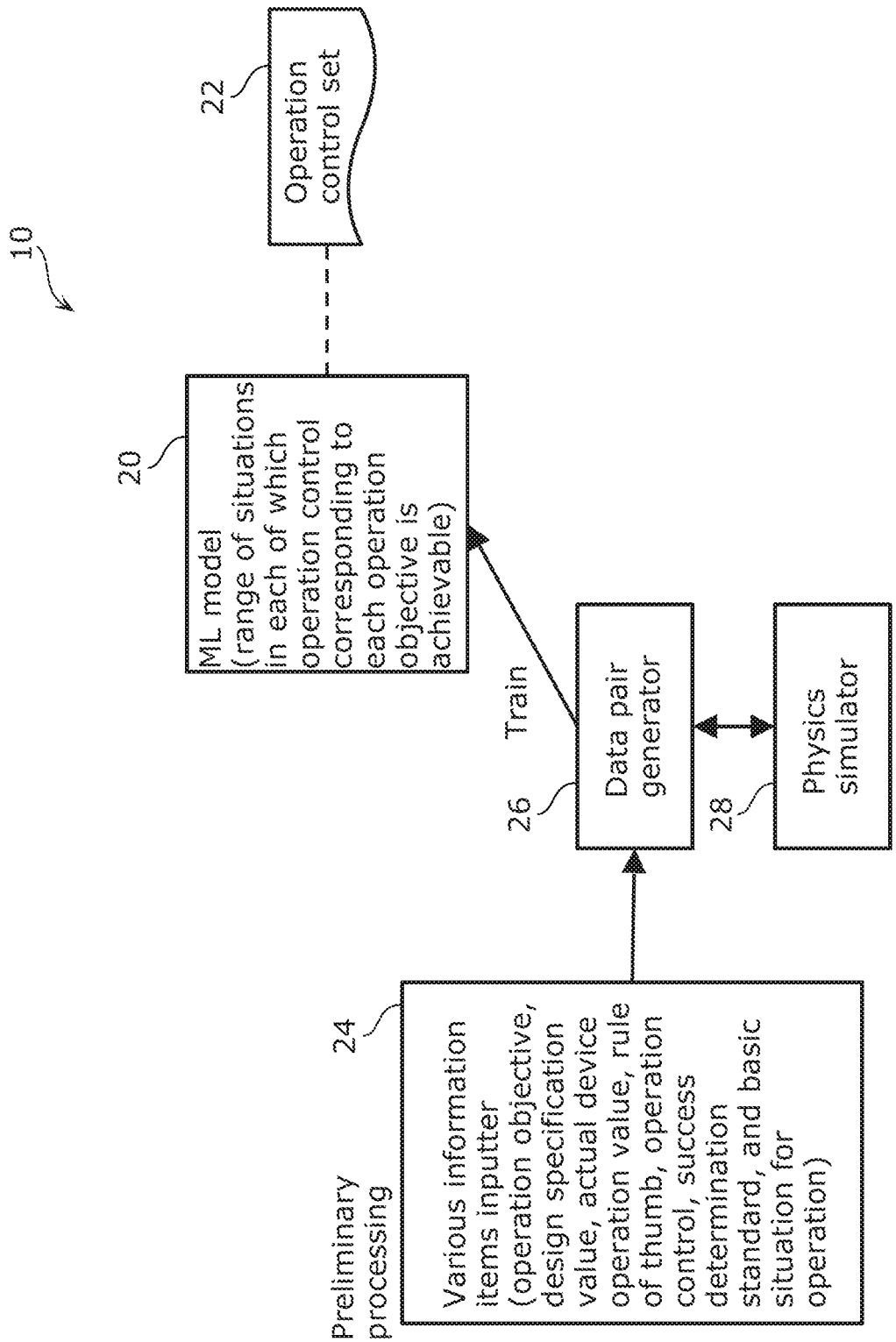
FIG. 4 is a diagram illustrating preliminary processing performed by the robot control device according to the embodiment.

FIG. 4 is a diagram illustrating preliminary processing performed by robot control device 10 according to the embodiment. Here, out of the block diagram illustrated in FIG. 3, only blocks relating to the preliminary processing are illustrated.

For the training of ML model 20 to be used for an operation control to be used, data pair generator 26 generates a great number of data pairs in each of which situation data and success or failure data are paired. The data pairs are training data for ML model 20. In the generation of data pairs, each of which indicating success or failure of an operation of an operation control in a situation, the following are generated: (i) data pairs generated for various situations, based on a design specification value, an actual device operation value, the rule of thumb according to a developer of the operation control, etc.; (ii) data pairs generated based on a standard for determining whether an operation control and an operation are successful or not; and (iii) data pairs generated based on results of executing an operation control in various situations using physics simulator 28 in which a basic (representative) situation for an operation of the operation control are inputted.

Figure 5:
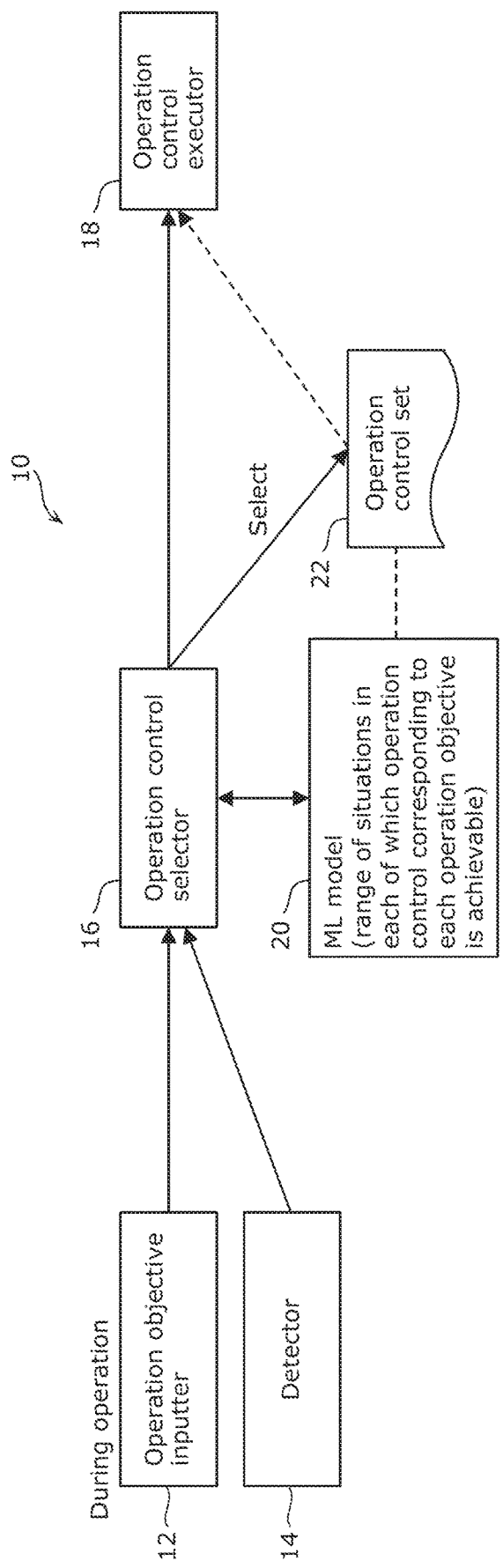
FIG. 5 is a diagram illustrating operations (operation controls) performed by the robot control device according to the embodiment.

FIG. 5 is a diagram illustrating operations (operation controls) performed by robot control device 10 according to the embodiment. Here, out of the block diagram illustrated in FIG. 3, only blocks relating to operations (operation controls) performed by robot control device 10 are illustrated.

Operation control selector 16 (i) inputs situation data indicating the present situation which is obtained from detector 14 to abstract models (ML models 20 provided according to the number of operation controls corresponding to an operation objective) each of which corresponds to an operation objective inputted from operation objective inputter 12 and in each of which the range of situations is described, and (ii) checks an output of each ML model 20 (each ML model 20 outputs an inferred value indicating whether an operation control corresponding to the operation objective is achievable or not).

Out of output values of ML models 20, operation control selector 16 determines an operation control that is achievable in the present situation (note that operation controls are achievable when ranges overlap), and selects an operation control from operation control set 22. Then, operation control executor 18 executes the selected operation control. In summary, operation control selector 16 inputs the present situation to ML models 20, infers success or failure of an operation of each operation control, and adopts and executes an operation control determined not to fail.

Alternatively, operation control selector 16 may (i) temporarily select, based on an operation objective, or based on an operation objective and the above-described command values, candidates for an operation control corresponding to the operation objective, (ii) determine a successful candidate using a machine learning model, and (iii) select an operation control based on any of the determination result, the operation objective, or the command value.

Figure 6:
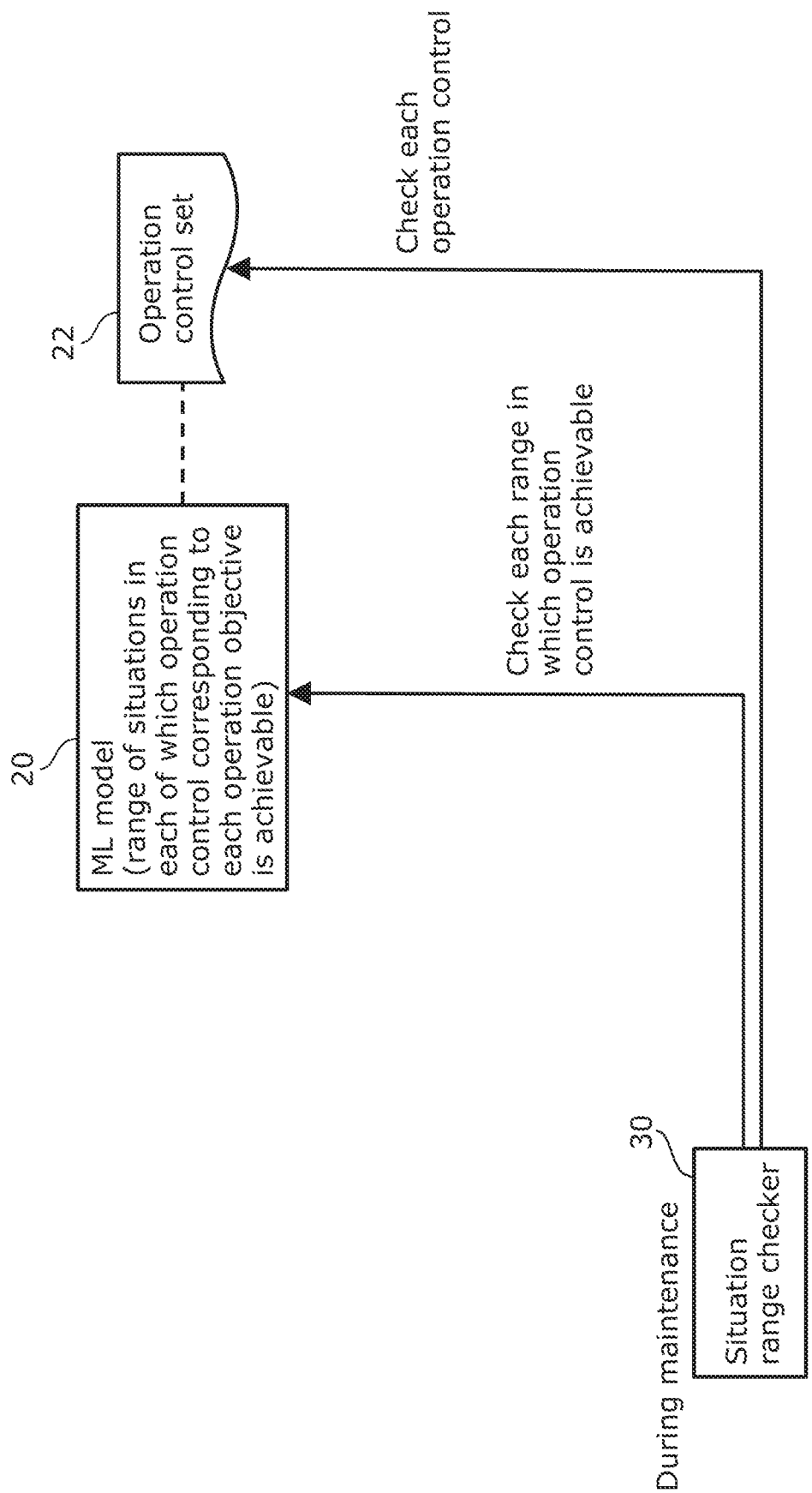
FIG. 6 is a diagram illustrating processing performed during maintenance, in other words, during evaluation and verification of the robot control device according to the embodiment.

FIG. 6 is a diagram illustrating processing performed during maintenance, in other words, during evaluation and verification of robot control device 10 according to the embodiment. Here, out of the block diagram illustrated in FIG. 3, blocks relating to maintenance, in other words, evaluation and verification are illustrated.

Situation range checker 30 checks ML model 20 (trained in the preliminary processing) for operation controls to find out, for an operation objective and a situation, which operation controls are associated with the operation objective and the situation, or to find out that no operation control is associated with the operation objective and the situation. If necessary, a new operation control is made, and is associated according to a procedure of the preliminary processing.

Moreover, when an improvement on an operation control to be executed in a situation for an operation objective is desired, situation range checker 30 determines (checks) an operation control that is associated with the situation, and modifies the operation control. Since operation controls are completely isolated (i.e., each operation control is independent) according to respective ranges of situations in each of which the operation control is achievable, the modification to an operation control does not affect other operation controls.

As described above, a check on success or failure of an operation control in a situation (check 1) can be made by situation range checker 30 checking an output of ML model 20. Moreover, an improvement on a control to be executed in a situation (check 2) can be made by situation range checker 30 searching through ML models 20 and modifying an operation control that is associated with the situation.

Figure 7:
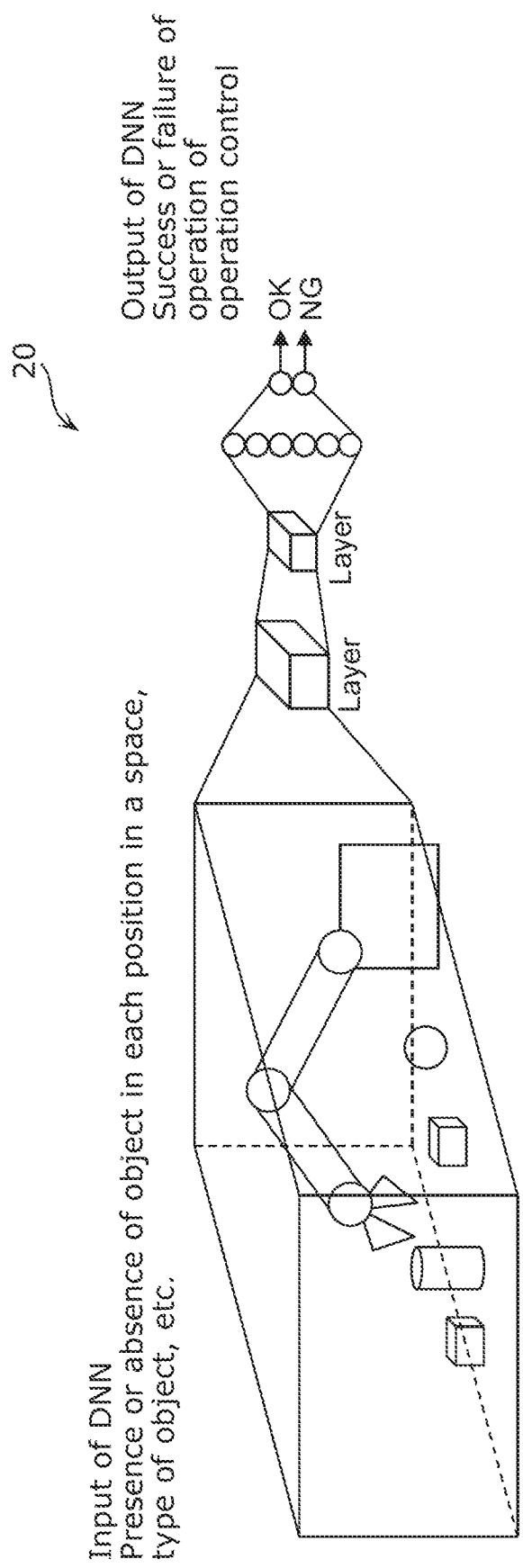
FIG. 7 is a diagram illustrating a specific example of a machine learning model included in the robot control device according to the embodiment.

FIG. 7 is a diagram illustrating a specific example of ML model 20 included in robot control device 10 according to the embodiment. In the embodiment, ML model 20 uses a deep neural network (DNN) called a three-dimensional convolutional neural network. This DNN uses, as input, presence or absence of objects in respective positions in a space, types of objects, etc. to output success or failure (OK or NG) of an operation of an operation control. Alternatively, the DNN may be any model relating to deep learning.

As has been described above, robot control device 10 according to the embodiment satisfies the following four requirements 1 through 4 for implementing the control of a robot.

Requirement 1 requires implementation of flexible control of a robot according to wide ranges of environments/situations.

Robot control device 10 according to the embodiment can satisfy Requirement 1 since a plurality of operation controls can be combined, and no restriction is placed on a type of control method.

Requirement 2 requires implementation of control of a robot with consideration given to a physical event (e.g., interference with an object by a target object, such as a push given to an object by the target object, friction caused by the target object, a movement of the target object along an object, and a change in balance due to the target object).

Robot control device 10 according to the embodiment can satisfy Requirement 2 since a physics simulator is used for determining the above-described physical events.

Requirement 3 requires, for each control routine (hereinafter, referred to as an operation control), clarification of a range of environments/situations in each of which the control routine for executing an operation is successful (i.e., a control routine is executed such that an objective is achieved).

Robot control device 10 according to the embodiment can satisfy Requirement 3 since ranges of situations in each of which an operation control is achievable are modeled according to robot control device 10. With this, it is possible to determine a control routine that is achievable, and therefore assurance of success of an operation, quality assurance, and assurance of operation can be provided. This enables advanced operation management.

Requirement 4 requires individual tuning of each operation control.

Robot control device 10 according to the embodiment can satisfy Requirement 4 since operation controls are individually handled for each range of situations in each of which the operation control is achievable.

Note that a robot controlled by robot control device 10 according to the embodiment is different from a robot in, for example, a factory, and is used in an unknown place according to wide ranges of environments, or in other words, various situations. For this reason, the robot is sometimes provided in a situation in which a control routine for an operation cannot be executed as intended, and this may cause the robot to malfunction. This malfunction may lead to damage to an object and injury to a person in the vicinity of the robot, and such damage and injury need to be prevented. Moreover, an unpredictable, unintentional action taken by a person (an adult or a child) in the vicinity of the robot may result in injury to the person since such a status could not have been predicted by the robot.

In such a case, the following may apply to robot control device 10. Robot control device 10 according to the embodiment can be a safety device, a safety mechanism, or an interlock for a control routine for an operation of the robot. ML model 20 included in robot control device 10 according to the embodiment outputs a value indicating (i) success of an operation of an operation control (i.e., the operation control can be executed as intended), or (ii) failure of the operation of the operation control (i.e., the operation control cannot be executed as intended) in the present environment/situation. With this, robot control device 10 according to the embodiment ensures that a control routine is not to be executed in an environment/situation in which the control routine cannot be executed as intended (see FIG. 10).

Figure 8:
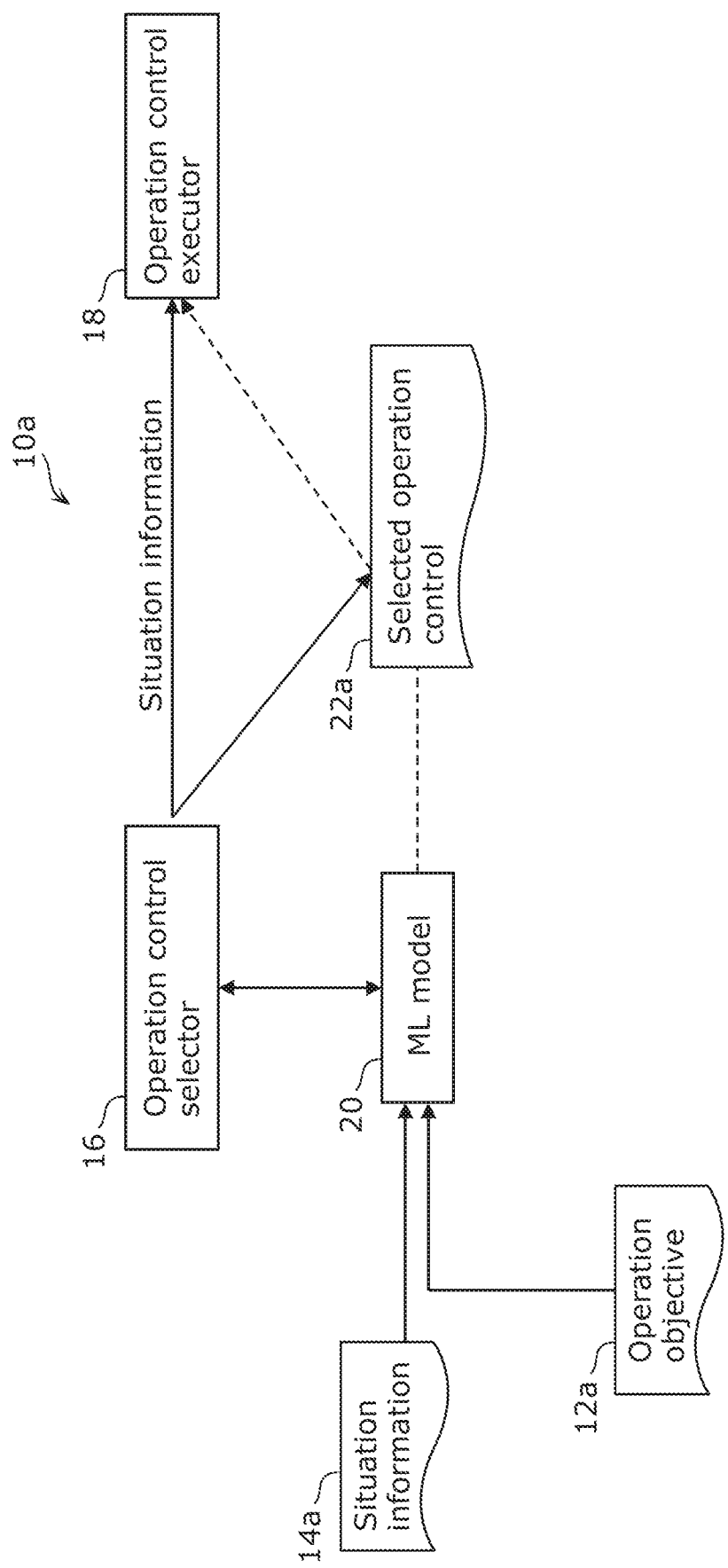
FIG. 8 is a diagram illustrating operations (operation controls) performed by a robot control device according to Variation 1 of the embodiment.

Note that, in the above-described embodiment, an operation objective and situation information are inputted to operation control selector 16 as illustrated in FIG. 5, but an operation objective and situation information, or an operation objective, situation information, and a command value (not illustrated) may be inputted to ML model 20. FIG. 8 is a diagram illustrating operations (operation controls) performed by robot control device 10a according to Variation 1 of the embodiment. In Variation 1, ML model 20 is a single machine learning model corresponding to a plurality of operation controls. When ML model 20 receives operation controls from operation control selector 16, ML model 20 returns, to operation control selector 16, output values each indicating success or failure of an operation of each received operation control achieving the inputted operation objective 12a in a situation indicated by the inputted situation information 14a. Operation control selector 16 selects one operation control, which is operation control 22a, based on the output values from ML model 20 for respective operation controls.

Figure 9:
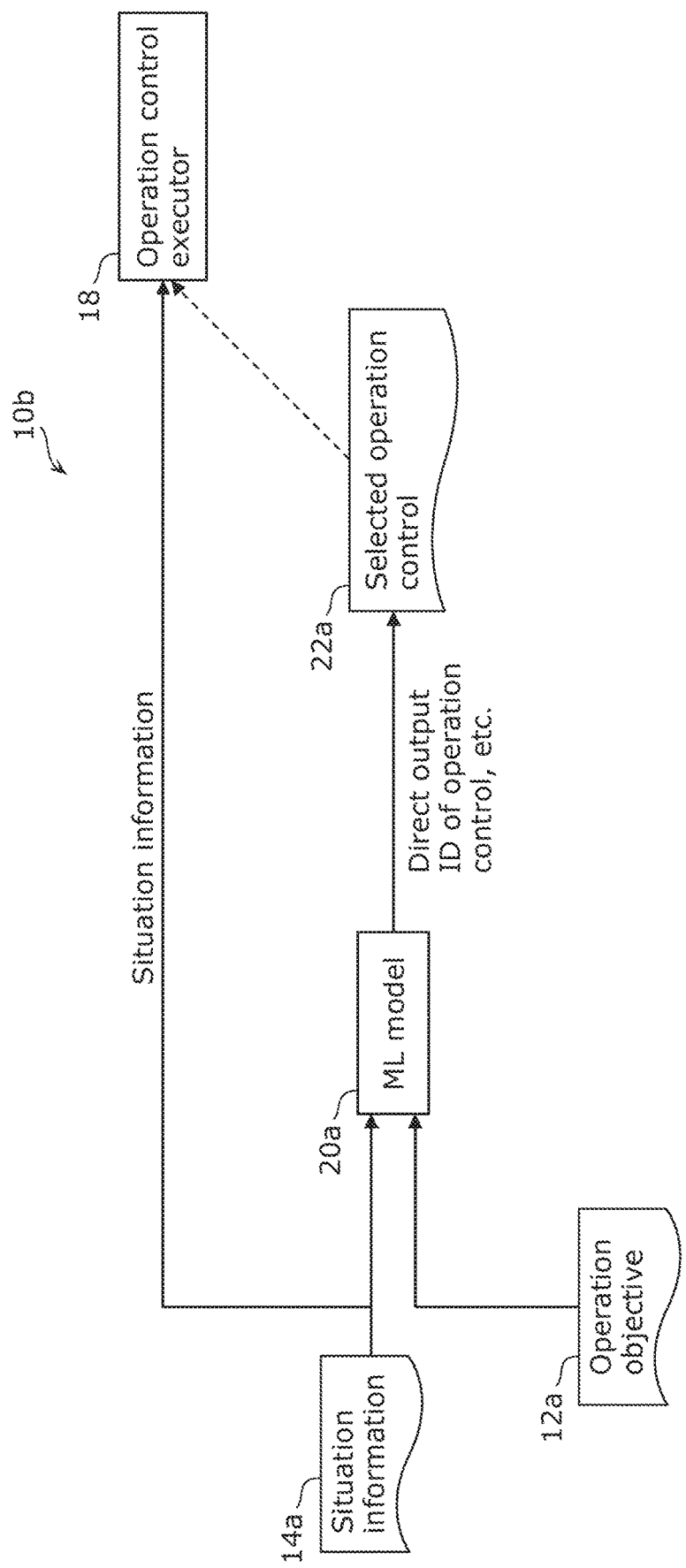
FIG. 9 is a diagram illustrating operations (operation controls) performed by a robot control device according to Variation 2 of the embodiment.

In the above-described embodiment, operation control selector 16 and ML model 20 are different processors as illustrated in FIG. 3, but operation control selector 16 and ML model 20 may be integrated into a single processor. FIG. 9 is a diagram illustrating operations (operation controls) performed by robot control device 10b according to Variation 2 of the embodiment. In Variation 2, ML model 20a has a function in which functions of operation control selector 16 and ML model 20 according to the embodiment are combined. That is, ML model 20a evaluates success or failure of each operation control achieving the inputted operation objective 12a in a situation indicated by the inputted situation information 14a, and selects one operation control, which is operation control 22a, based on a result of the evaluation. In this case, a value indicating success or failure or a degree of success of the operation is transmitted inside ML model 20a. The above-described ML model 20a can be implemented by, for example, DNN including a middle layer corresponding to operation control selector 16.

Moreover, although a plurality of operation objectives, and a plurality of operation controls capable of achieving respective operation objectives are present in the above-described embodiment as illustrated in FIG. 2, the configuration is not limited to the foregoing. There may be a single operation objective for the entire configuration, and the number of operation controls capable of achieving one operation objective may be one. When there is only one operation objective, operation objective inputter 12 need not be provided. However, when a plurality of operation controls corresponding to the one operation objective are present, it is significant that one operation control is selected using ML model 20, even if there is only one operation objective.

Moreover, even if there is only one operation control that corresponds to an operation objective, it is significant that determination as to whether the one operation control is to be achieved or not is made using ML model 20. When it is determined that the operation control is not to be achieved, the running processing routine may be terminated, or the processing may be changed by transmitting situation information indicating the present situation to a host computer device. This corresponds to an operation performed by a safety device or a safety mechanism as described above.

In generating and obtaining situation information, other than obtaining situation information using detector 14, situation information may be obtained by (i) calculating future situation information, (ii) receiving situation information that is obtained from a detector of another robot, (iii) referring to past situation information stored after a lapse of time, and (iv) directly receiving a communication such as an answer to an inquiry from an object or a person. Accordingly, it is possible to obtain wide ranges of situation information including various viewpoints.

Moreover, a machine learning model, an operation control, and/or a new function unit may transmit a signal relating to an operation control to detector 14, and detector 14 may perform, based on the signal, more advanced detection with consideration given to a characteristic of the operation control. For example, if success of an operation of the operation control varies due to a subtle difference in a positional relationship between objects in the vicinity, detector 14 may perform detection with focus on the subtle difference in the positional relationship. With this, it is possible to obtain situation information that is more effective in determining whether an operation of an operation control is successful or not.

As has been described above, it is possible to more precisely and accurately output, according to the situation, values indicating success or failure or a degree of success of an operation of an operation control.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be used as a robot control device, particularly as a robot control device that can individually manage and modify control of operations to be performed according to respective situations, while implementing flexible control of a robot according to wide ranges of environments/situations.

The invention claimed is:

1. A robot control device for controlling a robot, the robot control device comprising:
   a machine learning model configured to receive an input of an item of situation information selected from among items of situation information, and output an output value that is one of a binary value, a continuous value, or a multidimensional vector value indicating success or failure or a degree of success of an operation of an operation control in a situation indicated by the item of situation information which has been received, the items of situation information being information about the robot or a first object, and the items of situation information including: (i) physical characteristics including a physical structure and a shape; and (ii) a present status of at least one of a position, a posture, or a temperature that is a temporally varying characteristic;
   an operation control selector configured to obtain the output value for at least one operation control by providing the machine learning model with the item of situation information, when the item of situation information is received, and identify, based on the output value, an operation control to be executed; and
   an operation control executor configured to execute the operation control which has been identified by the operation control selector,
   wherein:
   the operation control is a control routine for the robot to achieve an operation objective by the robot sensing the first object using a sensor with interaction with a second object; and
   the machine learning model is configured to output the output value for the at least one operation control when the item of situation information is provided, the at least one operation control: (i) not being a primitive motion determined by a single motion vector or a single target position; and (ii) being a series of primitive motions for achieving the operation objective using a result obtained from the sensor as feedback information.

2. The robot control device according to claim 1, wherein:
   the item of situation information includes at least one of an absolute position of the first object, a relative position of the first object, a posture of the first object, a shape of the first object, or a type of the first object.

3. The robot control device according to claim 2, further comprising:
   a training data generator configured to generate, as training data for the machine learning model, a data pair in which situation data and success or failure data are paired, the data pair being generated from at least one of: (i) a design specification value; (ii) a result of an operation of the operation control which is performed by an actual robot; (iii) a predetermined value; or (iv) a result of the operation of the operation control which is performed in a physics simulator.

4. The robot control device according to claim 3, wherein:
   when the data pair is generated using the physics simulator, the training data generator is configured to: (i) provide the physics simulator with, in addition to the operation control, a condition defining a status in which the operation of the operation control is successful (ii) execute the operation control while variously changing, in the physics simulator, each of the items of situation information indicating an environment (iii) test whether the operation of the operation control is successful or not; and (iv) generate the data pair based on a result of the testing.

5. The robot control device according to claim 4, wherein:
   when testing whether the operation of the operation control is successful or not using the physics simulator, the training data generator is configured to: (i) identify at least one of the items of situation information in which the operation of the operation control is successful; and (ii) scan, from the at least one of the items of situation information which has been identified as a starting item to be scanned, each environment being one in which the operation of the operation control is tested.

* * * * *